United States Patent [19]

Holmen et al.

[11] Patent Number: 4,591,189

[45] Date of Patent: May 27, 1986

[54] DOCUMENT HAVING LIGHT-TRANSMISSIVE, ELECTRICALLY CONDUCTIVE AUTHENTICATING INTERIOR LAYER

[75] Inventors: Reynold E. Holmen, White Bear Lake; Edward J. Downing, St. Paul, both of Minn.

[73] Assignee: Minnesota Mining and Manufacturing Company, St. Paul, Minn.

[21] Appl. No.: 565,452

[22] Filed: Dec. 27, 1983

[51] Int. Cl.[4] .......................... B42D 15/00; B32B 7/14

[52] U.S. Cl. .......................................... 283/83; 283/91; 428/204

[58] Field of Search ........................ 283/82, 83, 84, 85, 283/86, 57, 91, 109, 94; 428/204

[56] References Cited

U.S. PATENT DOCUMENTS

| | | | |
|---|---|---|---|
| 3,755,935 | 9/1973 | Annenberg | 283/94 |
| 3,765,994 | 10/1973 | Quaintance et al. | 428/204 |
| 3,801,183 | 4/1974 | Sevelin et al. | 350/105 |
| 3,802,101 | 4/1974 | Scantlin | 283/91 |
| 3,876,865 | 4/1975 | Bliss | 283/83 |
| 3,998,160 | 12/1976 | Pearce | 283/82 |
| 4,020,389 | 4/1977 | Dickson et al. | 315/246 |
| 4,223,918 | 9/1980 | Smoczynski | 283/83 |
| 4,290,630 | 9/1981 | Lee | 283/57 |
| 4,409,471 | 10/1983 | Aigo | 283/82 |
| 4,432,567 | 2/1984 | Stockburger et al. | 283/83 |
| 4,443,027 | 4/1984 | McNeely et al. | 283/83 |
| 4,455,039 | 6/1984 | Weitzen et al. | 283/82 |

FOREIGN PATENT DOCUMENTS 2028376 3/1980 United Kingdom .

*Primary Examiner*—Paul A. Bell
*Assistant Examiner*—Paul M. Heyrana, Sr.
*Attorney, Agent, or Firm*—Donald M. Sell; James A. Smith; William B. Barte

[57] ABSTRACT

A standardized document such as a credit card has a thin, light-transmissive, electrically conductive interior layer, the impedance, capacitance, or conductance of which can be sensed to indicate the authenticity of the document. When the document is cut to expose a new edge, the authenticating layer at that edge is not visible to the naked eye and hence should foil the ordinary counterfeiter.

14 Claims, 5 Drawing Figures

DOCUMENT HAVING LIGHT-TRANSMISSIVE, ELECTRICALLY CONDUCTIVE AUTHENTICATING INTERIOR LAYER

FIELD OF THE INVENTION

The invention concerns a standardized document bearing visible indicia such as a credit card, a drivers license, or a label which contains a hidden device for providing added authentication of the document.

BACKGROUND ART

The counterfeiting of standardized documents such as passports and credit cards is a continuing problem. Even though credit cards and money cards generally carry magnetically readable stripes, they can easily be counterfeited. Drivers licenses commonly are laminates bearing a photograph beneath a transparent covering and also are easy to counterfeit. Some drivers licenses have been made more difficult to counterfeit by incorporating a legend which becomes visible only under retro-reflective viewing conditions as disclosed in U.S. Pat. No. 3,801,183 (Sevlin et al.). The same retro-reflective system has been used on phonograph labels. Even so, a need has continued for inexpensive techniques for making counterfeiting of standardized documents more difficult without appreciably adding to the cost of the documents or requiring expensive verifying equipment.

DISCLOSURE OF INVENTION

The present invention should satisfy that need by providing a standardized document including an authenticating interior layer which is light-transmissive and has an area of at least 1 $mm^2$, a thickness less than 200 nm, and an electrical resistivity less than 50 megohms per square. When the document is cut through the authenticating layer to expose a new edge, the layer at that edge is not visible to the naked eye.

By a "standardized" document is meant one of a large number of documents bearing visible indicia of like purpose and appearance such as credit cards, money cards, identification cards, drivers licenses, tickets, traveler's checks, passports, magnetic keys, labels such as for phonograph records, stock and bond certificates, and currency. Many such standardized documents are laminates, usually having wear-resistant plastic surface laminae, in which case the authenticating layer should be an interior lamina, e.g., between paper laminae. When a standarized document includes a transparent pouch which is peripherally sealed but not laminated to the indicia-bearing portion of the document, the authenticating interior layer may be on a surface of said portion or may be part of the pouch. Whether or not the standardized document includes such a pouch, the authenticating layer preferably is hidden beneath the indicia-bearing face of the document where it is less accessible to a would-be counterfeiter.

The authenticating layer may be applied by any technique for applying thin film coatings such as by vacuum deposition, sputtering, or electroless deposition, and its thickness may be increased by electrolytic deposition. A transparent ink comprising colloidal particles of an electrically conductive material may be used to form an authenticating layer by printing or roll coating. A preferred electrically conductive material for the authenticating layer is indium-tin oxide which conveniently is applied by sputtering, has excellent stability, and possesses both good lateral electrical conductivity and good light transmissivity. Other useful electrically conductive materials include gold, silver, nickel, chromium, copper, platinum, tin, aluminum, stainless steel and inconel. Aluminum is useful only at thicknesses which have lower initial optical transmissivity, because of its tendency to oxidize. A discussion of light-transmissive, electrically conductive thin film coatings and examples is to be found in the chapter entitled "Transparent Conducting Films" by J. L. Vossen in the textbook *Physics of Thin Films,* Vol. 9, Academic Press, New York (1977), pages 1–71, particularly pages 49–64.

In order to obtain high light transmissivity in combination with high electrical conductivity, the authenticating layer may be sandwiched between antireflective thin film layers, such as two layers of bismuth trioxide sandwiching a layer of gold, all applied by vacuum deposition. Two thin film layers of titanium suboxide sandwiched around gold provide more durability with the same benefit. After deposition, the suboxide oxidizes to the dioxide according to U.K. Patent Application GB No. 2,028,376 published Mar. 5, 1980. Another preferred sandwich consists of a thin film zinc sulfide layer on each side of a silver layer, all applied by vacuum deposition (See U.S. Pat. No. 4,020,389).

When the standardized document is light-transmissive and its authenticating interior layer is less than coextensive with the document, the pattern of the authenticating layer might be revealed by viewing the document against a bright light. In such event, it is desirable to imprint areas between discrete areas of the authenticating layer to provide uniform light transmissivity. Even if the entire laminated document is opaque, a highly light-transmissive authenticating layer is less likely to be visible at an edge-cut in spite of having a thickness approaching 200 nm. Preferably the thickness of the authenticating layer is less than 20 nm to insure invisibility to the naked eye at a cut edge in the event that the transmissivity of the layer to visible light is less than 70%.

The presence of the authenticating layer may be verified by any of several inexpensive devices that can be built unobtrusively into mechanisms such as are currently used either to make a visual record of raised characters or to reproduce information magnetically recorded on magnetic stripes. Among such devices are (1) reflective impedance devices (for example, proximity switches and grid-dip meters); (2) those measuring electrical conductivity (the reciprocal of the measured ohmic resistance in a direct current system); and (3) those measuring capacitance. Useful proximity switches include Automatic Timing Controls Proximitrol Switch Series 705 and Truck Multiplex Inc. Model BC20-K405R-VN6X. A device which senses changes in capacitance or reflective impedance can be fitted to actuate light emitting diodes to show the pattern of an authenticating layer which is only at selected discrete areas. Devices which measure capacitance are considered to be much less effective for detecting selected discrete areas.

The resistivity of the authenticating layer should be less than 50 megohms per square, preferably less than 1000 ohms per square, and desirably less than 100 ohms per square. When the resistivity approaches or is greater than 2 megohms per square, care should be taken to avoid the possibility of spurious low order conductivity which might produce ambiguous results. Grid-dip meters are useful for detecting the presence of an authenticating layer that is highly electrically conductive, preferably having a resistivity of less than 1000 ohms per square.

The authenticating layer of the standardized document may have a plurality of independent paths, each of which may extend from one edge to at least one other edge of the document. The standardized document may contain a plurality of electrically conductive terminals at said edges, with each end of each of said paths electrically contacting one of said terminals. A small number of electrodes can permit a group of related documents to have a large number of differing path combinations.

Additional verification may be provided by measuring the light transmissivity of the document. While a would-be counterfeiter may be able to produce authenticating layers having the proper conductivity, considerable sophistication is required to produce specific combinations of conductivity and light transmissivity, especially when multiple layers are required to attain such a combination.

Documents of the invention may carry magnetically readable stripes and may also incorporate other authenticating schemes such as the retro-reflective system of the above-mentioned U.S. Pat. No. 3,801,183.

In spite of the sophistication required to operate equipment for applying thin film coatings, mass-produced standardized documents of the invention should cost as little as 10 or 20 percent more than documents which would be identical except for omission of the authenticating layer.

THE DRAWING

In the drawing

Figure 4:
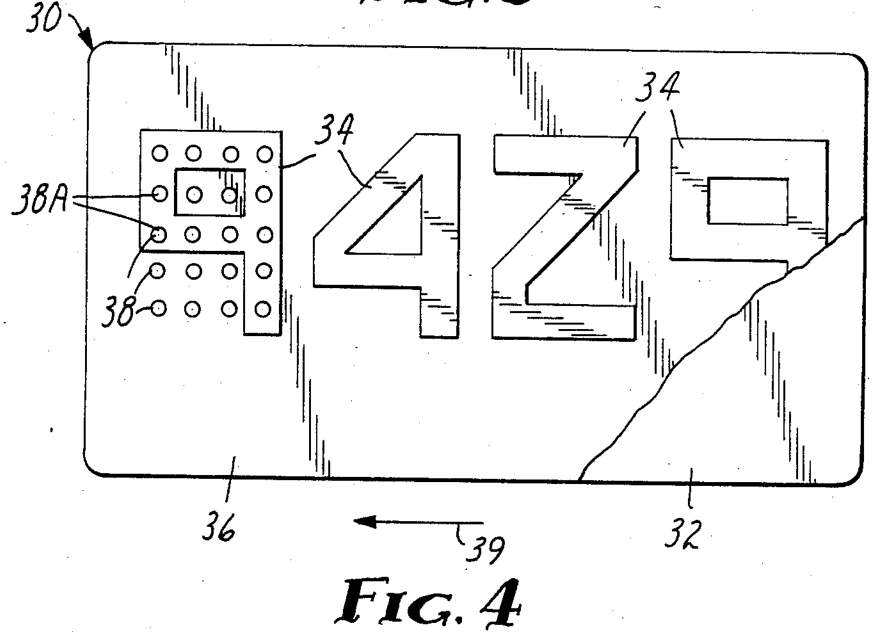
Figure 5:
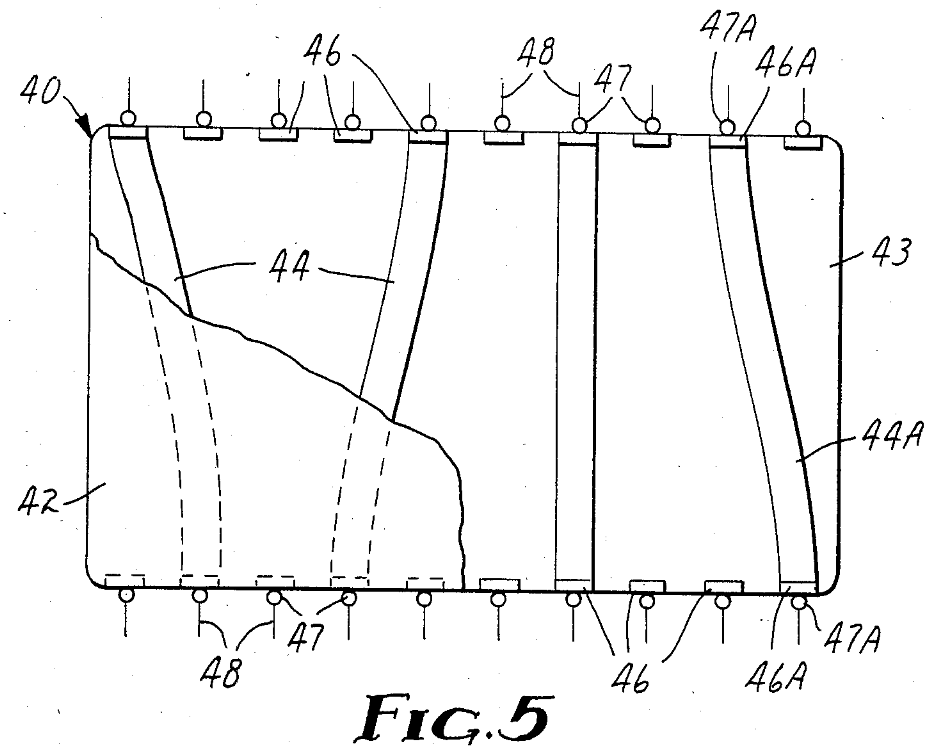

FIG. 4 schematically illustrates a third standardized document of the invention in the form of a card, the electrically conductive authenticating layer of which has a pattern revealed by a light emitting diode display; and FIG. 5 schematically illustrates a fourth standardized document of the invention in the form of a card and apparatus for sensing the edge-to-edge conductivity of its electrically conductive authenticating layer.

Figure 1:
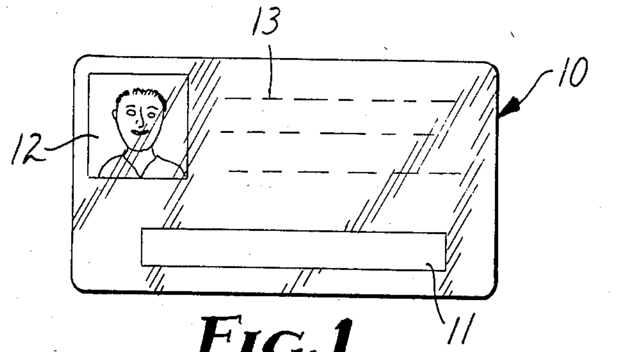
FIG. 1 shows the face of a standardized document of the invention in the form of an identification card.
Figure 2:
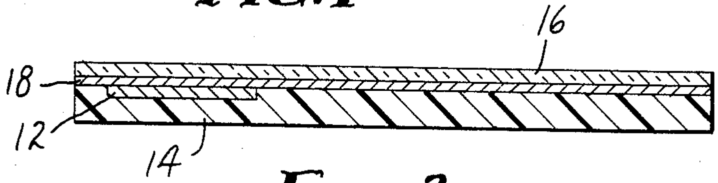
FIG. 2 is an enlarged schematic cross-section of the document of FIG. 1.

The standardized document 10 shown in FIGS. 1 and 2 includes the bearer's photograph 12 which is sandwiched between an opaque plastic base layer 14 and a coextensive transparent plastic protective layer 16. Overlying the photograph 12 and the base layer 14 and beneath the transparent protective layer 16 is a layer 18 of an electrically conductive material which is highly transparent to visible light and hence substantially does not interfere with viewing of the photograph, a signature block 11, and printed indicia 13 on the base layer. More commonly a single photograph includes a signature, printed indicia and the bearer's likeness.

Figure 3:
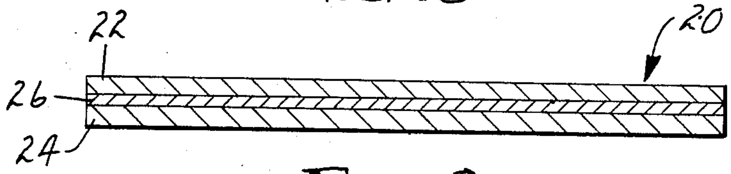
FIG. 3 is a schematic cross-section of another standardized document of the invention.

The standardized document 20 shown in FIG. 3 has protective top and base layers 22 and 24 of paper sandwiching a layer 26 of electrically conductive material.

The standardized document 30 shown in FIG. 4 has a protective top layer 32 broken away to reveal an underlying base layer 36 on which is a layer 34 of electrically conductive material in selected discrete areas in the form of an alphanumeric pattern. The document 30 is positioned beneath a bank of sensors 38, each connected to a light emitting diode (not shown) which lights up whenever its sensor (38A) is in close proximity to the electrically conductive material. By advancing the document 30 stepwise in the direction of the arrow 39, the same bank of sensors 38 would scan the characters represented by the alphanumeric pattern. Alternatively, a single sensor may be programmed to scan the document to collect and reveal the same information.

The standardized document 40 shown in FIG. 5 has its top layer 42 broken away to reveal a base layer 43 bearing an authenticating layer 44 which is laterally electrically conductive and has a plurality of independent paths, each extending from one edge to another edge of the document. Because of the thinness of the layer 44, thicker electrically conductive terminals 46 have been printed at the edges of the base layer 43 to facilitate brief electrical contact to a plurality of electrodes 47. The electrodes 47 are connected by wires 48 to a sensing device (not shown) to indicate conductive paths such as the path between electrodes 47A through terminals 46A and the conductive path 44A.

Independent conductive paths may also be sensed in the following manner. A pattern of perforations in the top layer 42 may be filled with electrically conductive ink, with only some ink-filled perforations contacting one or more conductive paths. Electrical contact to a sensing device may be made through the ink-filled perforations.

EXAMPLE 1

Onto biaxially-oriented polyethylene terephthalate polyester film of 0.075 mm thickness was vapor coated a 3-layer ZnS-Ag-ZnS having a resistivity of less than 30 ohms per square. Light transmissivity of these combined three layers at 550 nm was greater than 70%. The ZnS layers were 50 nm and the Ag authenticating layer was 13 nm in thickness.

A sample identification card 8.5 by 5.4 cm (Dek-Electro System 10) was split into front and back sections of approximately equal thickness. A piece of the vapor-coated polyester film the same size as the card was laminated between the front and back sections of the card using two pieces of a pressure-sensitive adhesive transfer tape. The resulting standardized document actuated a reflective impedance-sensing device; an unmodified document did not. The sensing device was an Automatic Timing Controls Series 7053 Proximitrol switch, the sensing head of which had been replaced by a pointed tip. When the document is cut to expose a new edge, the Ag authenticating layer is not visible to the naked eye.

EXAMPLE 2

Another piece of the vapor-coated polyester film used in Example 1 was provided with three discrete electrically conductive areas by erasing with a pencil eraser portions of the Ag authenticating layer. This piece was laminated between the front and back sections of another split identification card in the same manner as in Example 1. In the resulting standardized document, the conductive areas were separated by non-conductive strips, each 9.5 mm in width and extending across the width of the card. The bar code provided by the three conductive Ag areas was decoded by passing over the face of the document the Proximitrol switch sensing tip used in Example 1.

EXAMPLE 3

A layer of chromium was vapor deposited onto the back side of a transparent, retroreflectively verifiable, legend-bearing film such as described in U.S. Pat. No. 3,801,183. The thickness of the chromium authenticating layer was about 2 nm as measured by a Sloan Model 1000 crystal-type deposition monitor. The authenticating layer had an electrical resistivity of 500,000 ohms/sq.

The chromium coated face of the film was laminated with pressure-sensitive adhesive to the front face of a facsimile drivers license to provide a standardized document of the invention. This document was easily differentiated from an unmodified retroreflectively verifiable drivers license by use of the Proximitrol switch as in Example 1, even though the two were visually indistinguishable.

EXAMPLE 4

To a 0.075 mm polyester film were successively applied a full coating of 53 nm ZnS, a transparent ink in the pattern of an emblem, and full coatings of 13 nm Ag and 50 nm ZnS. The coated film was placed with the final ZnS coating adjacent to the face of a sample identification card and laminated thereto to provide a standardized document of the invention.

A grid-dip meter showed the presence of the Ag authenticating layer. The emblem was invisible when the document was viewed at a right angle to its face, but its shape could be seen at oblique angles.

DISCRIMINATION BY MEASURING CAPACITANCE

Two aluminum panels 15×15×0.13 cm were spaced facing each other 0.9 mm apart and connected to a Sprague Electric Model 2W1 capacitance meter. When each of the documents of Examples 1, 2, and 3 was inserted between the aluminum plates, the capacitance meter read 33 picofarads, versus 30 picofarads for unaltered comparison cards. With only air between the aluminum plates, a reading of 30 picofarads also was obtained.

We claim:

1. A standardized document including an authenticating interior layer which is light-transmissive and has an area of at least 1 $mm^2$, a thickness less than 20 nm, and an electrical resistivity less than 1000 ohms per square wherein the authenticating layer is sandwiched between antireflective thin film layers and, when the document is cut through the authenticating layer to expose a new edge, the authenticating layer at the edge is not visible to the naked eye.

2. Document as defined in claim 1 wherein the authenticating layer has a thickness less than 20 nm and a resistivity less than 1000 ohms per square.

3. Document as defined in claim 2 wherein the authenticating layer comprises silver and is sandwiched between two thin film layers of zinc sulfide.

4. Document as defined in claim 2 wherein the authenticating layer comprises gold sandwiched between two thin film layers selected from bismuth trioxide and titanium dioxide.

5. Document as defined in claim 1 wherein the authenticating layer has a transmissivity to visible light of at least 70%.

6. Document as defined in claim 1 wherein the authenticating layer has a transmissivity to visible light of at least 85%.

7. Document as defined in claim 1 wherein the authenticating layer comprises a material selected from indium-tin oxide, gold, silver, nickel, chromium, copper, platinum, tin, aluminum, stainless steel, and inconel.

8. Document as defined in claim 1 wherein said authenticating layer is coextensive with the document.

9. Document as defined in claim 1 wherein said authenticating layer is less than coextensive with the document.

10. Document as defined in claim 9 wherein said authenticating layer is only at selected discrete areas.

11. Document as defined in claim 10 wherein said authenticating layer is laterally electrically conductive and extends to at least two different edges of the document.

12. Document as defined in claim 11 wherein said authenticating layer forms a plurality of independent paths, each extending from one edge to at least one other edge of the document.

13. Document as defined in claim 12, wherein there are a plurality of electrically conductive terminals at said edges, each end of each of said paths contacting one of said terminals.

14. Document bearing visible indicia and comprising a plurality of laminae and including as an authenticating interior layer a lamina of electrically conductive material having an electrical resistivity less than 1000 ohms per square and a transmissivity to visible light of at least 70%, wherein said authenticating interior layer comprises a conductive thin film sandwiched between antireflective thin film layers.

* * * * *